United States Patent
Schaeff

[15] 3,664,452
[45] May 23, 1972

[54] AXLE SUSPENSION FOR AUTOMOTIVE VEHICLES

[72] Inventor: Friedrich Schaeff, Am Hollberg 19, Bensheim-Auerbach, Germany

[22] Filed: Dec. 4, 1969

[21] Appl. No.: 882,159

[30] Foreign Application Priority Data

Dec. 4, 1968 Germany ............... P 18 12 634.6

[52] U.S. Cl. ................................. 180/71, 267/18, 267/31, 267/36
[51] Int. Cl. ............... B60g 9/00, B60g 11/12, B60g 11/34
[58] Field of Search ...................... 180/71; 267/18, 31

[56] References Cited

UNITED STATES PATENTS

| | | | |
|---|---|---|---|
| 1,679,268 | 7/1928 | Rigney | 267/31 |
| 3,063,733 | 11/1962 | Morris | 267/18 X |
| 3,237,957 | 3/1966 | Harbers | 267/18 X |
| 3,309,107 | 3/1967 | Chieger | 267/31 X |
| 3,547,215 | 12/1970 | Bird | 180/71 |

Primary Examiner—A. Harry Levy
Attorney—Edwin E. Greigg

[57] ABSTRACT

In automotive vehicles, in order to ensure that the engine stub shaft and the differential stub shaft (both connected with the drive shaft by universal joints) form identical angles with the drive shaft at all times during springing motions of the driven axle, the latter is mounted on the vehicle chassis by means of a quadrilateral suspension. One side of said suspension is a vertically pivotable axle bracket made of a horizontally flexing leaf spring that carries the axle tube and an air spring engaging said chassis; an opposite side of said suspension is a vertically flexing leaf spring held at its ends and attached at its mid portion to said axle tube.

8 Claims, 10 Drawing Figures

AXLE SUSPENSION FOR AUTOMOTIVE VEHICLES

BRACKGROUND OF THE INVENTION

This invention relates to a suspension for a vehicle axle driven by a drive shaft and connected with a differential and is further of the type that is associated with a swinging axle bracket, one end of which is pivotally held by the chassis, while the other end is secured to the chassis with the interposition of an air spring. To the axle bracket there is fixedly secured the axle housing or axle tube.

It is a disadvantage of known axle structures that the stub shafts connected to both ends of the drive shaft by means of universal joints and associated with the engine and with the differential, respectively, are disposed parallel with one another only in a normal position (travel on plane, smooth surface). During springing, however, the said stub shafts form unequal angles with the drive shaft axis. The consequence is a non-uniform rotational speed of the stub shaft that drives the differential resulting in an uneven run of the vehicle.

In order to maintain the angle deviations of the universal joints of the drive shaft at a small value, suspension structures for driven vehicle axles have been provided, wherein the axle is mounted on a forwardly projecting auxiliary frame joined to the middle of the vehicle frame at the frontal portion thereof. The air springs are carried by that portion of said auxiliary frame that extends rearwardly beyond the axle. The latter is held in axial direction by means of a transversal member. Such a structure involves considerable expense and may not be used for converting existing vehicle structures.

OBJECT, SUMMARY AND ADVANTAGES OF THE INVENTION

It is an object of the invention to provide an improved suspension for a driven vehicle axle to ensure, in a simple and relatively inexpensive manner, that the stub shafts connected to the drive shaft by universal joints are disposed parallel with one another at all times resulting in an identical and uniform rotational speed thereof.

Briefly stated, according to the invention there is provided, for each end of the axle, a quadrilateral axle suspension, one side of which is formed by a first leaf spring which flexes vertically, parallel with the springing direction of said air spring. That side of said quadrilateral axle suspension which lies opposite said first leaf spring constitutes said axle bracket and is formed as a second leaf spring that flexes horizontally in a direction parallel with the axle.

The spring leaf or spring leaves of the first leaf spring of each quadrangular suspension are soft and serve to take up axial forces generated between the axle and the chassis. The first leaf springs become effective when the air springs are active. In case of non-uniform springing, the two first leaf springs are flexed and twisted. The second leaf springs, on the other hand, pivot during each springing motion and are twisted in case of uneven springing of said air springs.

The aforenoted structure may be installed in existing vehicles to replace conventional suspension structures. Such installation does not require any substantial modification of the vehicle chassis, since components thereof may be incorporated in the suspension according to the invention.

The invention will be better understood, as well as further objects and advantages will become more apparent, from the ensuing detailed specification of several exemplary embodiments taken in conjunction with the drawing.

BRIEF DESCRIPTION OF THE DRAWING

FIG. 8b is a sectional view taken along line E—E of FIG. 8a; and

FIG. 8c is a partial side elevational view of the structure shown in FIG. 8a.

DESCRIPTION OF THE EMBODIMENTS

Figure 1:
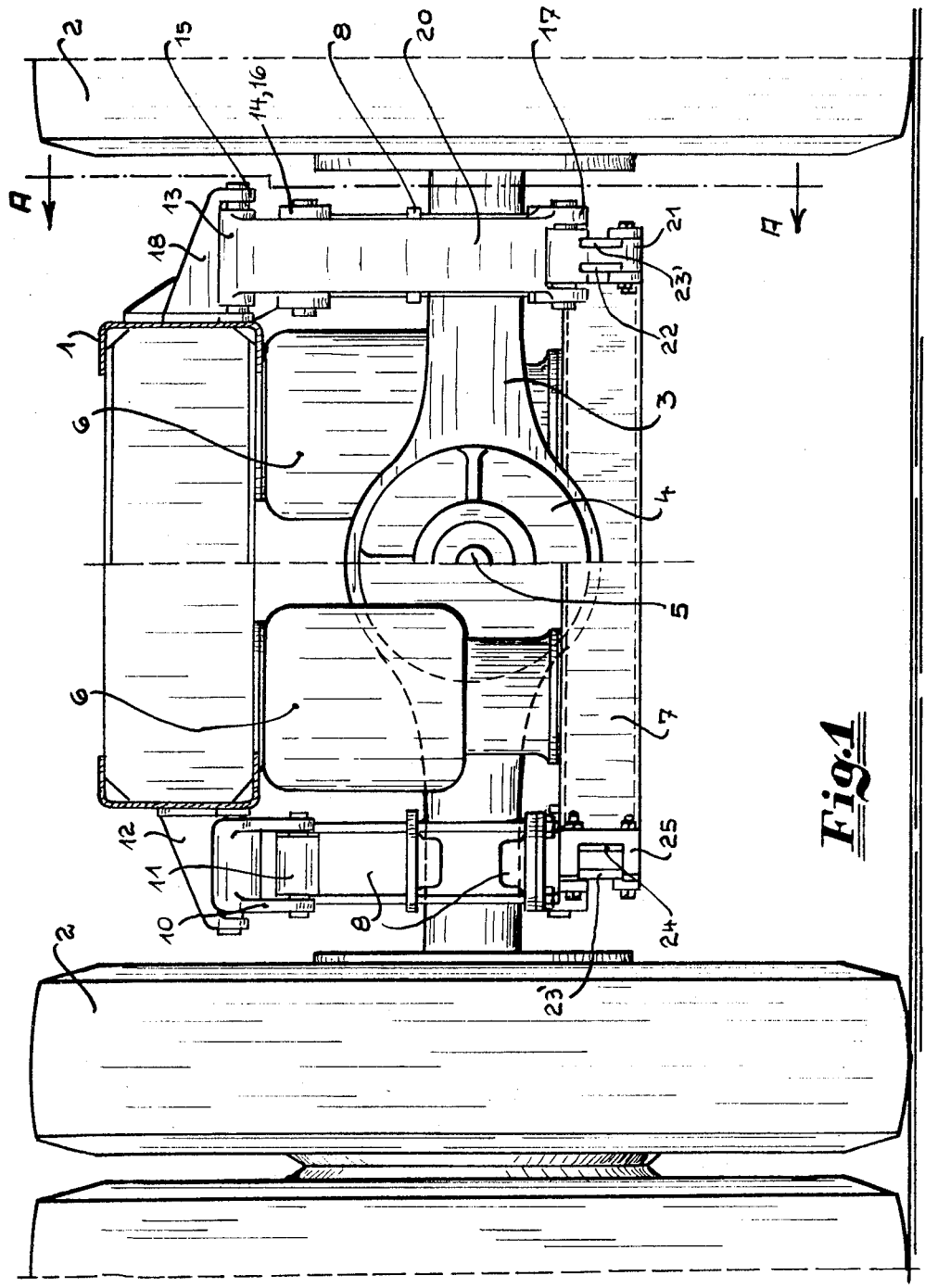
FIG. 1 is a composite front elevational view (to the right of the center line) and rear elevational view (to the left of the center line) of a first embodiment of the invention.

In FIG. 1 there is shown a chassis 1, wheels 2, an axle tube 3, a differential housing 4, a differential stub shaft 5, air springs 6, an air spring support beam 7, and a clamping yoke 8 affixed to the axle tube 3.

Figure 2:
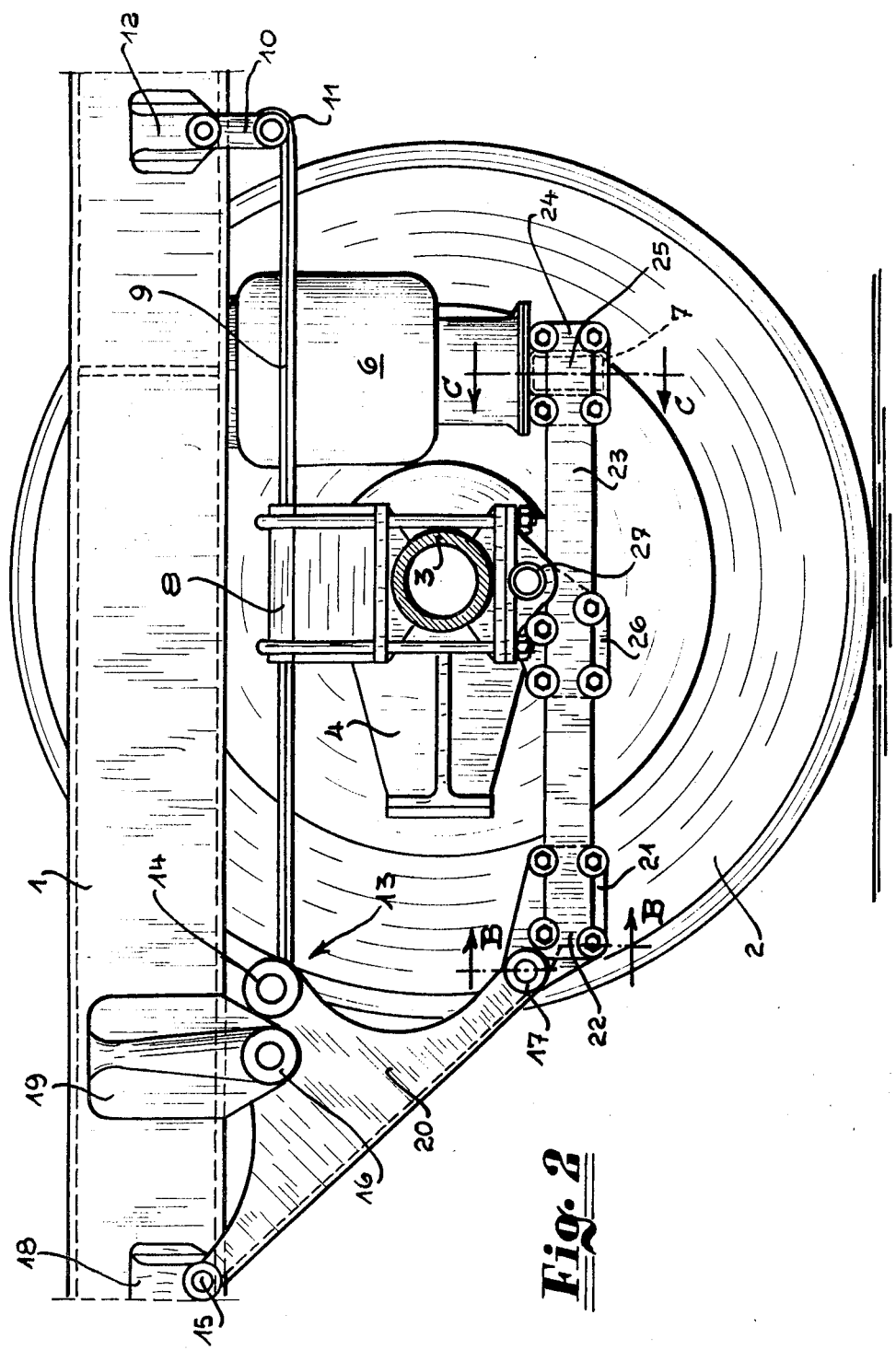
FIG. 2 is a sectional view along line A—A of FIG. 1.

Turning now to FIG. 2, a first leaf spring 9 formed of two superposed individual springs extends in the direction of vehicle travel and is fixedly held at its mid portion by the clamping yoke 8. The rear spring terminal 11 is suspended from a link 10 which is coupled to a spring support 12. The latter, in turn, is affixed to the chassis 1. The other terminal 13 of the first leaf spring 9 is provided with a joint which is received in a fork or eyelet 14 of a linkage bracket 20. The latter is provided with three further coupling eyelets 15, 16 and 17. The bracket 20 is rigidly affixed to the chassis 1 by eyelet 15 coupled to support 18 and by eyelet 16 connected to support 19. Supports 18 and 19 are affixed to chassis 1. It is to be noted that supports 12 and 18 in a conventional suspension structure prior to conversion may have served as suspensions for a leaf spring stack.

The eyelet 17 of the linkage bracket 20 forms a joint for a support member 21 which holds one end 22 of a second leaf spring 23 which, similarly to the first leaf spring 9, is also formed of two spring leaves. A further support member 24 holds the other end 25 of the second leaf spring 23 and is rigidly connected with the air spring support beam 7. With the second leaf spring 23 there is associated a third spring support member 26 which connects the mid portion of the second leaf spring 23 with the clamping yoke 8 of the axle tube 3 by means of a joint 27. As it may be observed from FIGS. 1 and 2, the leaf spring 23 is so dimensioned that it is relatively wide in a first plane that extends substantially vertically and longitudinally relative to the direction the vehicle travels and it is relatively narrow in a second plane normal to the first plane.

The afore-described structure is duplicated adjacent the other end of the axle on the other side of the vehicle.

When the vehicle is in motion on a plane surface, the first leaf spring 9 and the second leaf spring 23 remain unflexed. Said first leaf spring 9 and second leaf spring 23 form two opposite sides of a quadrilateral suspension, the third and the fourth sides of which are formed by the clamping yoke 8 and the linkage bracket 20, respectively.

If the air spring 6 is compressed, the first leaf spring 9 is flexed upwardly by the clamping yoke 8. It is noted that the first leaf spring 9 also replaces the transversal stabilizer required in conventional axle suspension structures, since said first leaf spring 9 is capable of rigidly taking up axial forces because of its arrangement parallel with the direction of travel and transmitting them to the chassis 1. During a flexing of the leaf spring 9 its ends 11 and 13 journal in the link 10 and eyelet 14. The axle tube 3 and the air spring 6 are displaced to an identical extent which is a desired feature of the structure according to the invention.

During springing motion of air springs 6, the second leaf spring or axle bracket 23 pivots in the eyelet 17. If said springing motion is uneven, the air bags 6 are sprung unevenly, the air spring support beam 7 will assume a position inclined with respect to the path of travel, and thus both the second leaf springs 23 will be twisted by the torque generated.

Figure 7:
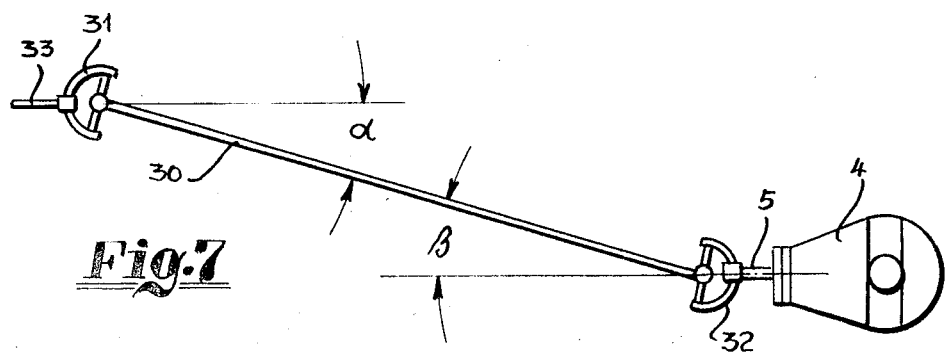
FIG. 7 is a diagrammatic view of a drive shaft and adjacent associated components.

It is thus seen that in this manner the first leaf spring 9 compels the differential housing 4 to maintain its orientation for all springing motions. In FIG. 7 there is shown the differential housing 4 with the differential stub shaft 5 and the drive shaft 30 with the universal joints 31 and 32, as well as the engine stub shaft 33. Due to the kinematics of the quadrilateral suspension 8, 9, 23, 20, the angle α which is formed between the engine stub shaft 33 and the drive shaft 30, as well as the angle β which is formed between the differential stub shaft 5 and the drive shaft 30, remains practically unchanged when the distance between the differential housing 4 and the chassis 1 changes.

Figure 3:
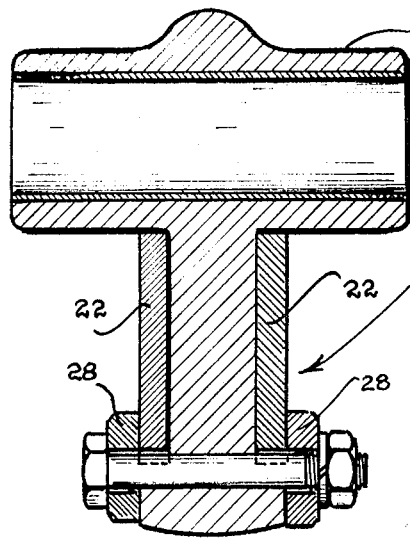
FIG. 3 is a sectional view along line B—B of FIG. 2.
Figure 4:
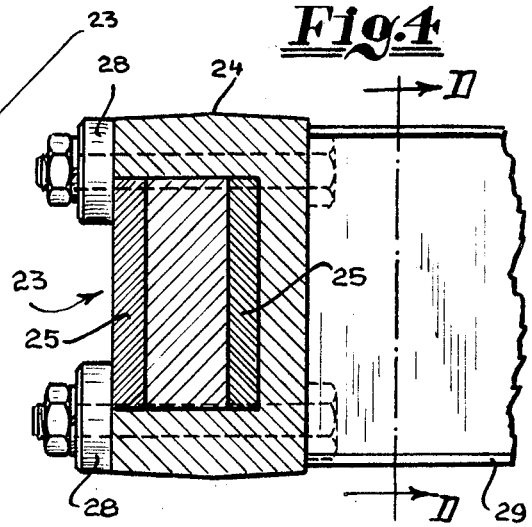
FIG. 4 is a sectional view along line C—C of FIG. 2.

FIGS. 3 and 4 show that the terminals 22 and 25 of the second leaf spring 23 are secured in the supports 21 and 24, respectively, by means of shackles 28 tightened by counter-screws. The cross sectional FIGS. 3, 4 further illustrate that the leaf spring 23 is formed of two parallel spaced spring leaves.

Figure 5:
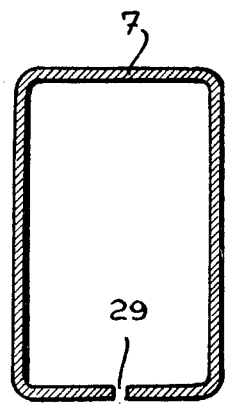
FIG. 5 is a sectional view along line D—D of FIG. 4.

As seen in FIG. 5, the air spring support beam 7 is hollow and is downwardly open by means of a longitudinal slot 29. The beam structure is thus adapted to deform responding to a torque, while it remains substantially rigid to a bending force.

Figure 6:
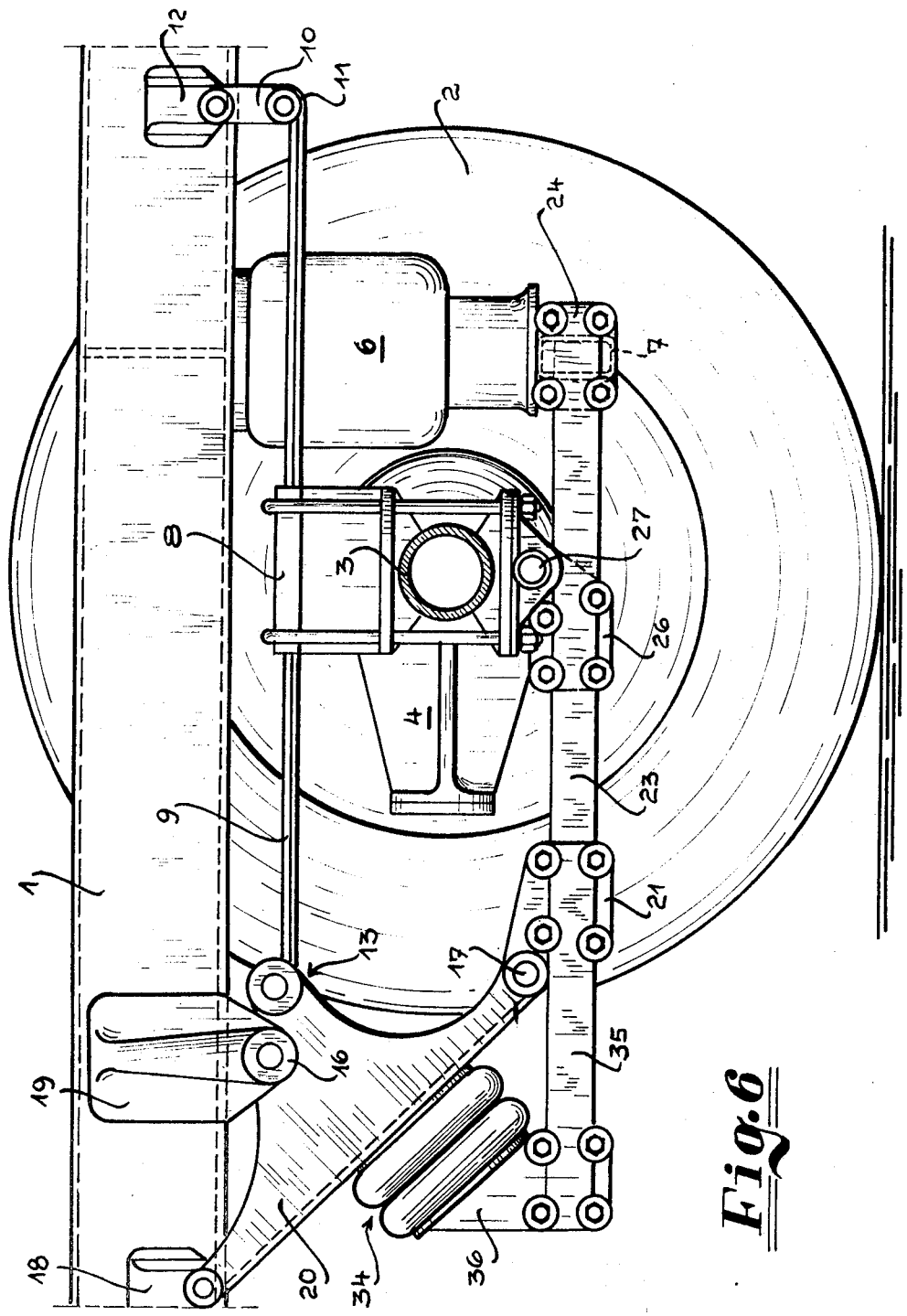
FIG. 6 is a side elevational view of a second embodiment of the invention.

Turning now to FIG. 6, the embodiment shown therein differs from the embodiment hereinabove described in that there is provided an inflatable air bag 34 disposed on an extension 35 of the second leaf spring 23 remote from the air spring 6. The air bag 34, which is affixed to the extension 35 by means of a support 36, is in operative engagement with the linkage bracket 20. The purpose of the air bag 34 is described hereinafter.

It is sometimes a requirement — for example, for some types of loading or unloading operations — to lower the vehicle chassis 1 with respect to the axle tube 3 to a greatest possible extent. For this purpose the air springs 6 are vented. Even though the first leaf spring 9 is relatively weak, the weight of the chassis 1 may not be sufficient to overcome entirely the upwardly directed opposing spring force and, consequently, the chasis will not sink low enough. For assisting the gravitational force of chassis 1, the air bag 34 is inflated. The force thus generated imparts a counterclockwise torque on the second leaf spring 23 about joint 17. As a result, the downward movement of chassis 1 is power-assisted; the first leaf spring 9 is flexed upwardly.

Figure 8A:
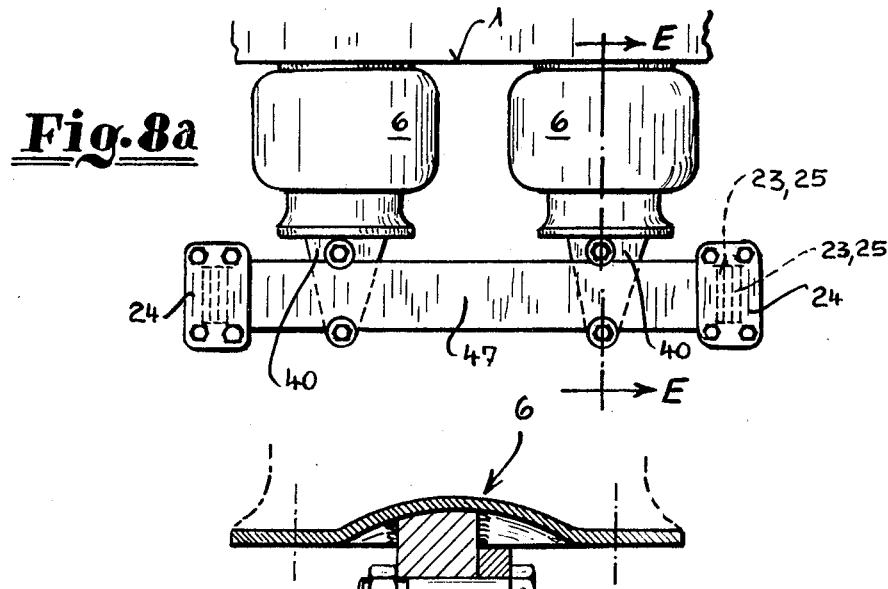
FIG. 8a is a partial rear elevational view of a third embodiment of the invention.
Figure 8B:
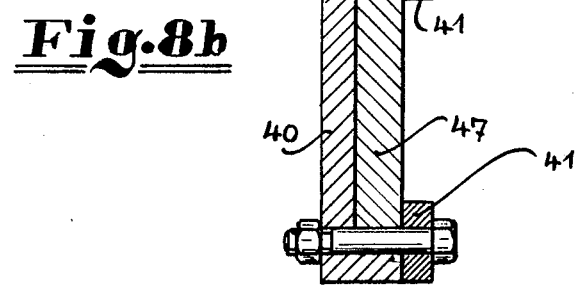

Turning now to FIG. 8a, the air spring support beam is formed here as a solid bar 47 of rectangular cross section extending edgewise under the chassis 1 and carrying the air springs 6. As best seen in FIG. 8b, each air spring 6 is affixed to the bar 47 by means of a support 40 and shackles 41. The support 40 is welded to the base of the air spring 6. The relatively flat bar 47, similarly to the beam 7, is adapted to twist when exposed to a torque.

Figure 8C:
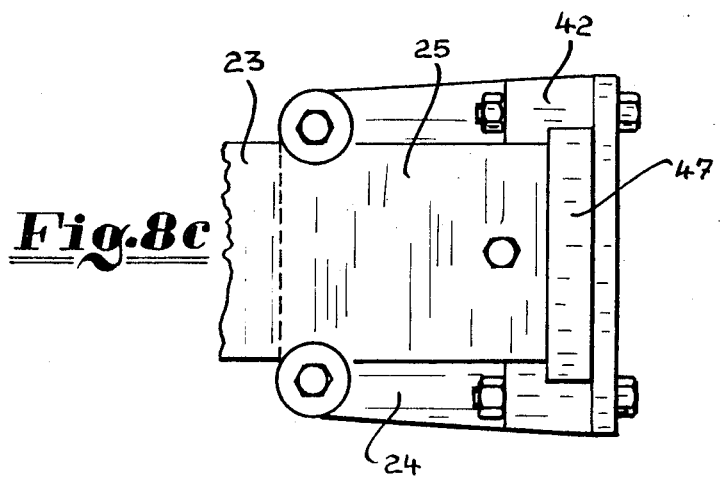

In FIG. 8c there is illustrated the support 24 which carries the leaf spring 23 and which is secured to the bar 47 by means of bolts and straps 42.

In case of uneven springing motions of air springs 6 (particularly in curves), the bar 47 is twisted, but not bent. For such instances the bar 47 functions as a stabilizer and delays the normal flexing.

That which is claimed is:

1. In an axle suspension for automotive vehicles of the type including (a) a vehicle chassis, (b) a differential associated with the axle, (c) a drive shaft for driving said axle, (d) an axle bracket pivotally connected to the vehicle chassis, (e) a horizontal axle tube affixed to said axle bracket and extending substantially normal to the direction of travel and (f) air spring means supported at least indirectly by said axle bracket and connected to said chassis, the improvement comprising a quadrilateral suspension having A. a leaf spring constituting said axle bracket and forming a first side of said quadrilateral suspension, said leaf spring being relatively wide in a first plane extending substantially vertically and longitudinally relative to the direction of travel, said leaf spring being relatively narrow in a second plane normal to said first plane, said leaf spring being adapted to flex in a direction parallel with said axle tube,
   B. a clamping yoke forming a second side of said quadrilateral suspension and situated adjacent said leaf spring, said clamping yoke carrying said axle tube and
   C. means for jointedly securing said clamping yoke to said leaf spring,
   D. means forming a third side of said quadrilateral suspension, said third side being disposed opposite said first side, and
   E. means forming a fourth side of said quadrilateral, said fourth side being disposed opposite said second side.

2. An improvement as defined in claim 1, said means forming said third side including a further leaf spring flexing in a direction identical to the springing motion of said air spring means, said clamping yoke being affixed approximately to the middle of said further leaf spring, at least one end of said further leaf spring being connected to said chassis.

3. An improvement as defined in claim 1, wherein said leaf spring is formed of two spacedly stacked spring leaves.

4. An improvement as defined in claim 1, wherein each end of said axle tube is associated with a separate quadrilateral suspension, the leaf springs of the two suspensions are interconnected by a transversal beam supporting said chassis through said air spring means.

5. An improvement as defined in claim 4, wherein said beam is hollow and longitudinally open.

6. An improvement as defined in claim 4, wherein said beam is a non-bendable torsion bar.

7. An improvement as defined in claim 4, including
   A. a linkage bracket attached to said chassis, said linkage bracket forming said fourth side,
   B. a first support member securing one end of said leaf spring to said linkage bracket,
   C. a second support member securing the other end of said leaf spring to said transversal beam and
   D. a third support member securing the mid portion of said leaf spring to said clamping yoke.

8. An improvement as defined in claim 7, wherein said second support member rigidly secures said leaf spring and said transversal beam to one another.

* * * * *